United States Patent
Chen et al.

[11] Patent Number: 5,657,854
[45] Date of Patent: Aug. 19, 1997

[54] ROLLER CONVEYOR

[75] Inventors: Kuan-Chou Chen, Hsininn; Kuo-Ching Liu, Hsinchu; Duen-Jyh Shyr, Chutung, all of Taiwan

[73] Assignee: Industrial Technology Research Institute, Taipei, Taiwan

[21] Appl. No.: 506,915

[22] Filed: Jul. 26, 1995

[51] Int. Cl.⁶ .................................................. B65G 13/02
[52] U.S. Cl. ............................ 198/787; 198/790; 193/35 R
[58] Field of Search ................................ 198/860.1, 790; 193/35 R, 37

[56] References Cited

U.S. PATENT DOCUMENTS

| | | | |
|---|---|---|---|
| 3,252,556 | 5/1966 | Isacsson | 198/35 R |
| 3,751,122 | 8/1973 | Dubay | 193/35 R X |
| 4,056,180 | 11/1977 | Gunti | 193/35 R X |
| 4,681,203 | 7/1987 | Kornylak | 193/35 R |
| 4,887,707 | 12/1989 | Harms | 198/790 X |
| 4,993,541 | 2/1991 | Roh | 198/790 X |
| 5,186,314 | 2/1993 | Clopton | 198/860.1 X |
| 5,209,342 | 5/1993 | Vom Stein | 198/790 |
| 5,360,100 | 11/1994 | Bourgeois | 198/790 |
| 5,361,894 | 11/1994 | Solcz | 198/860.1 |
| 5,423,418 | 6/1995 | Furrow | 193/35 R X |

*Primary Examiner*—D. Glenn Dayoan
*Attorney, Agent, or Firm*—Beveridge, DeGrandi, Weilacher & Young, L.L.P.

[57] ABSTRACT

A roller conveyor composed of a main body, several rollers, a roller's fixed block and a transmission device and is shaped as a rectangle or a circular arc. The two sides of the main body are preferably composed of an aluminum extrusion frame. The roller is fixed on the aluminum extrusion frame at the two sides of the main body by coupling with a pair of roller's fixed blocks, one being connected to a concave trough positioned on each side of the main body. The inner part of the roller includes a bearing stand of cup shape, a central shaft, an end cover, and a bearing of industrial use. On the outer surface, there is a concave trough for connection with a PU belt and a transmission device to turn and power the rollers. Also, another embodiment of the invention employs a leaning cone roller-type conveyor to make the roller comply with the circular arc shape and enable the conveyor to make a turn.

16 Claims, 8 Drawing Sheets

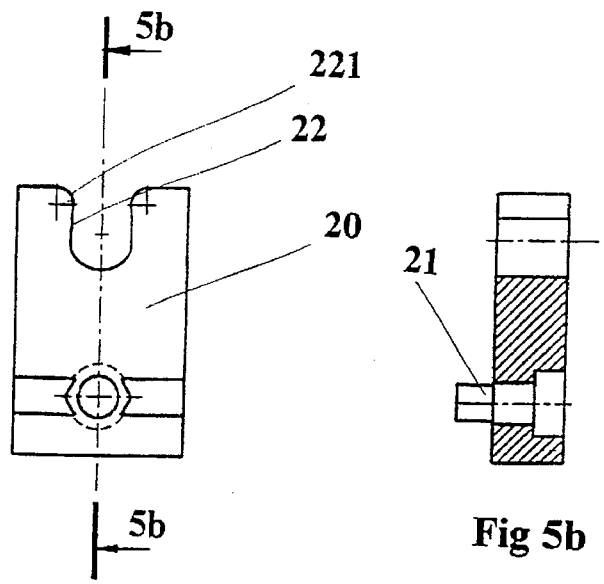
Fig 5a
Fig 5b
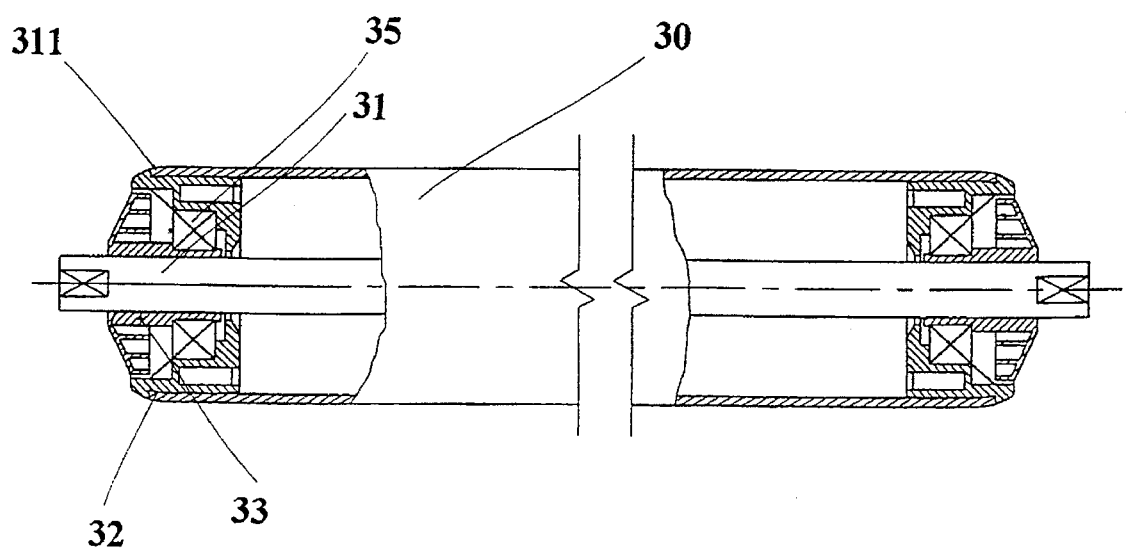
Fig 6

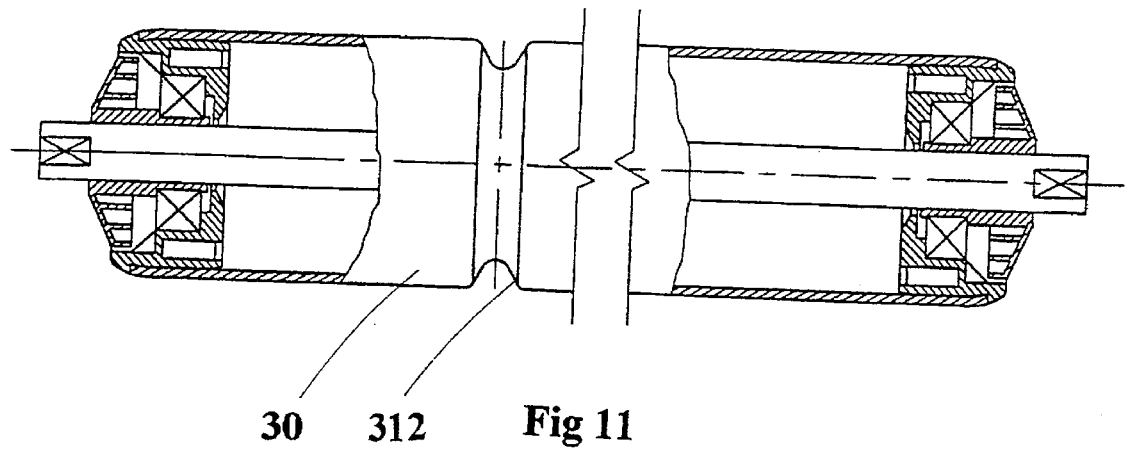
30  312  Fig 11
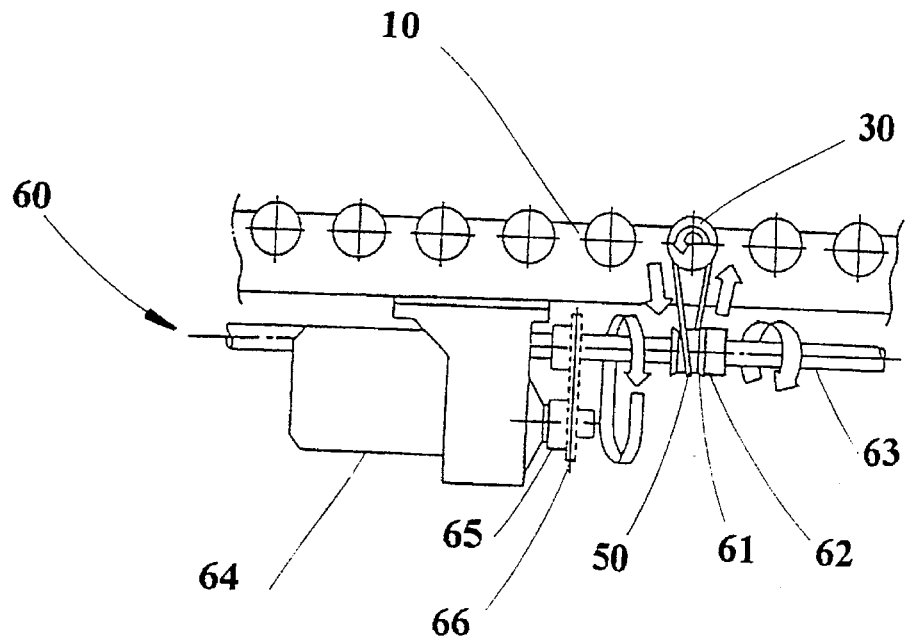
Fig 12

ROLLER CONVEYOR

FIELD OF THE INVENTION

This invention is related to an improved equipment of the roller conveyor which possesses the features of having simplified and rapid production, lowering cost, having low noise and raise the convenience of assembling and taking them apart.

BACKGROUND OF THE INVENTION

The main body of the traditional roller conveyor is composed of forming steel. It does not look good in appearance and lacks the flexibility of being replaced. Therefore, the whole set of roller would be fallen off and scattered around when being taken apart. Besides, the roller is composed of steel tubes and common bearings. It takes a lot of time when being taken apart, makes big noise and is short in service life. Moreover, it is not easy to be operated smoothly. As a result, the life would be shortened and it will affect the production efficiency. It cannot fulfill the economical efficiency.

SUMMARY OF THE INVENTION

The main purpose of this invention is to provide an improved roller conveyor. An aluminum extrusion frame and special trough design are the two sides of the roller conveyor's main body. Meanwhile, it is easy to put the roller on the roller's fixed block by roller's fixed block installed on the aluminum extrusion frame. It is also easier to assemble and take the roller conveyor apart.

A secondary purpose of this invention is to reveal an improved equipment of the roller conveyor. There is a groove at the suitable place of the roller's outer edge. Through the connection of a PU belt driving equipment, the roller conveyor is powered and forms a power roller conveyor.

Another purpose of this invention is to provide an improved equipment of the roller conveyor. The roller can be a leaning cone roller. It can comply the circular arc measure of the circular arc main body.

It enables the leaning cone roller to be operated stably. In the same time, the end of the roller is the design of the engineering plastic. Thus, it can achieve the features of dustproof, good appearance, being operated smoothly with low noise, and for allow installation and parts replacement.

Therefore, the equipment of the roller conveyor is improved, not just the beautiful color of the aluminum appearance, but also the increased flexibility of change and easy assembly with the special trough design. It can save labor time and raise the quality and efficiency of the roller conveyor. Thus, in order to obtain a clear understanding of the structures, purposes, characteristics and effectiveness of this invention, a detailed and clear explanation of the invention, accompanied with the following figures follows.

BRIEF DESCRIPTION OF THE DRAWINGS

FIG. 5 is the roller's fixed block view of this invention;

FIG. 6 is the roller structure of this invention;

FIG. 11 is the track roller structure of this invention.

FIG. 12 is the drived method view of this invention.

DESIGNATION IN THE DRAWINGS

| 10 | The main body of aluminum extrusion material | 323 | Trough |
|---|---|---|---|
|  |  | 324 | Leaning ring |
| 11 | Aluminum extrusion frame | 33 | End cover |
| 12 | Aluminum extrusion pillar | 331 | Protuberant part |
| 13 | Trough | 35 | Bearing |
| 14 | Nut | 40 | Leaning cone roller |
| 15 | Connecting block | 41 | Circular arc outer frame |
| 20 | Roller's fixed block | 42 | Circular arc inner frame |
| 21 | Protuberant shoulder | 50 | PU belt |
| 22 | U opening trough | 60 | Transmission device |
| 221 | Little protuberant edge | 61 | Guided pulley |
| 30 | Roller | 62 | Incased ring |
| 31 | Roller's shaft | 63 | Transmission shaft |
| 311 | Contracted mouth | 64 | Motor |
| 312 | Concave trough | 65 | Belt wheel |
| 32 | Bearing stand of cup shape | 66 | Timing belt |
| 321 | Trough for putting bearing | 70 | Universal joint |
| 322 | Trough bottom |  |  |

DETAILED DESCRIPTION OF THE INVENTION

Figure 1:
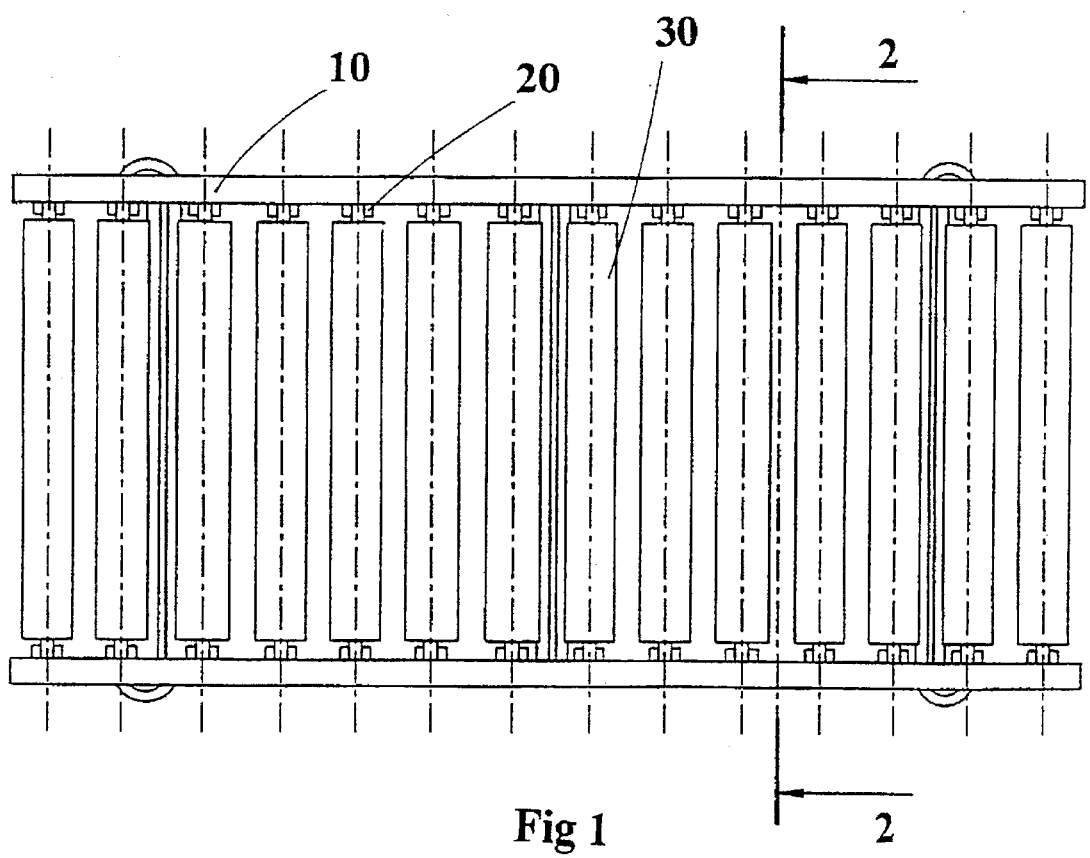
FIG. 1 is the roller conveyor's top view of this invention.
Figure 2:
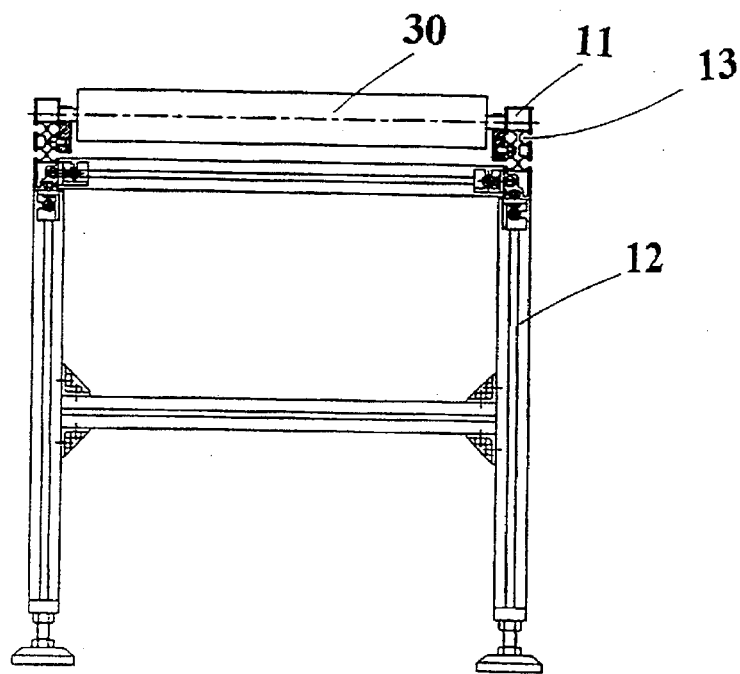
FIG. 2 is the roller conveyor's section view of this invention.

Please refer to FIGS. 1 and 2, the roller conveyer's view from above and section view of this invention. It is composed by a main body (10), roller's fixed block (20) and roller (30). The main body (10) is composed of two parallel aluminum extrusion frames (11) and aluminum extrusion pillar (12). Between the two aluminum extrusion frames (11), there are several rollers (30). The special shape of the trough in the aluminum extrusion frame (11) enables installation of several roller's fixed block (20), and inlay the roller (30).

Figure 3:
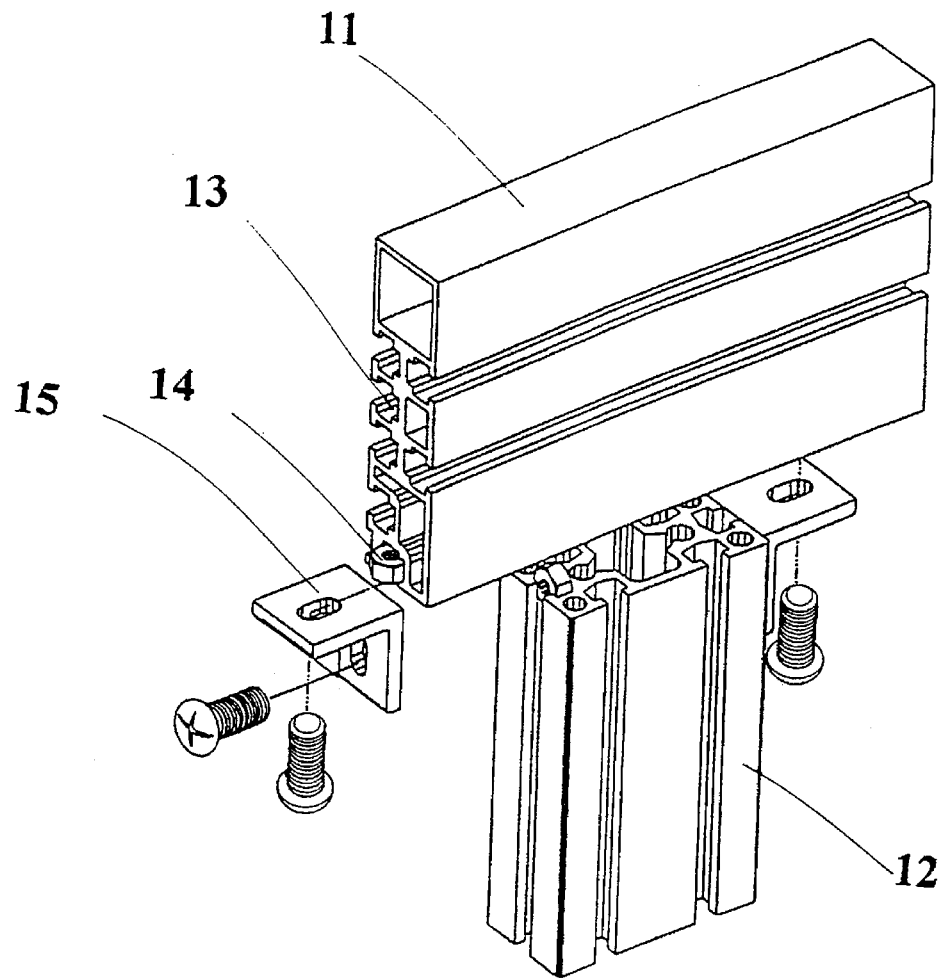
FIG. 3 is the connection view of the frame and pillar of this invention.

FIG. 3 is the connection view of the frame and standing pillar. The aluminum extrusion frame (11) possesses the special trough shape design. The aluminum extrusion pillar (12) and aluminum extrusion frame (11) can be fixed together as to one unit by a nut (14a) and a L-shaped connecting block (15).

Figure 4:
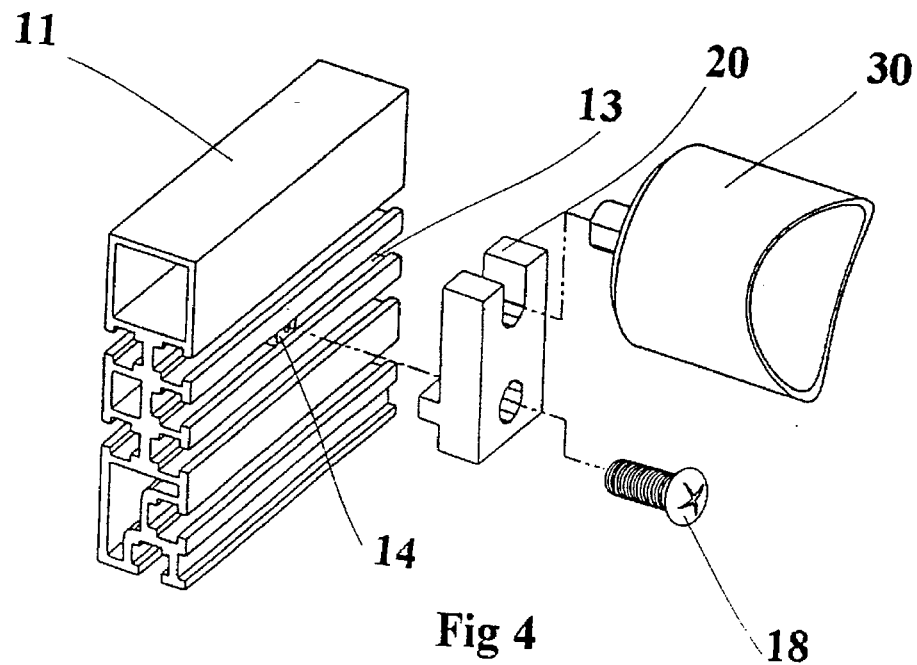
FIG. 4 is the roller's installation view of this invention.
Figure 7:
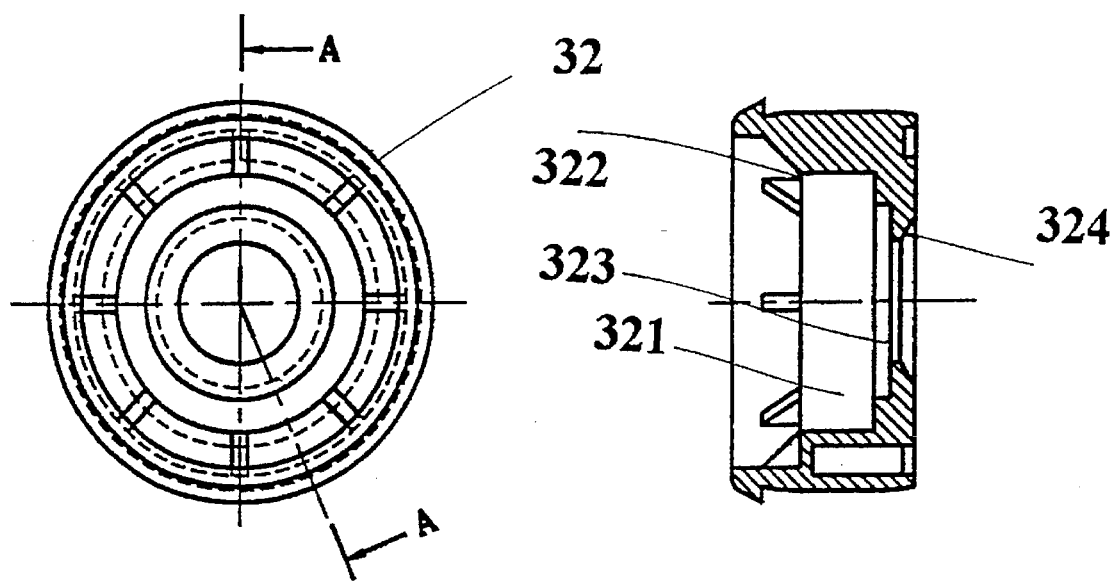
FIG. 7 is the bearing stand view of this invention.
Figure 8:
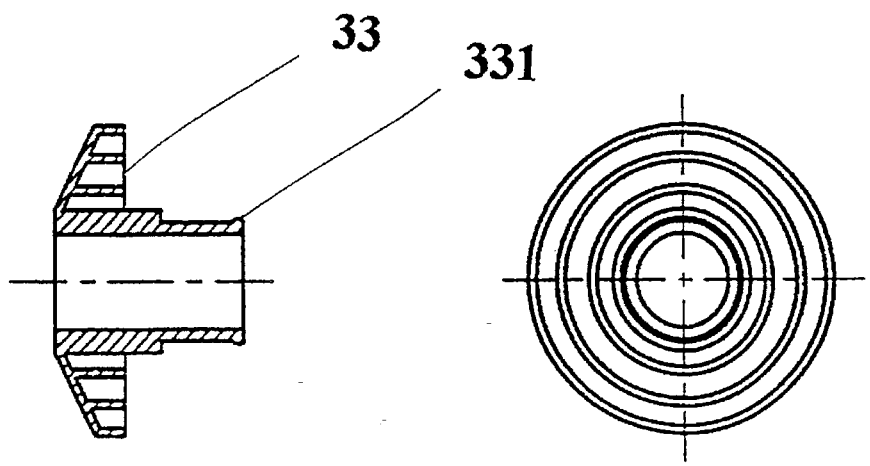
FIG. 8 is the end cover view of this invention.

FIG. 4 is the roller installation view of this invention. First, a nut (14b) is placed within the suitable trough of the aluminum extrusion frame (11). Then, the roller's fixed block (20) is fixed on it with bolt (18). At the same time, please refer to FIG. 5, which is an illustration of the structure of roller's fixed block (20). The protuberant shoulder (21) is set in the bottom of back side of the roller fixed block (20). When installing, it is convenient to inlay the trough (13) of the aluminum extrusion frame (11). (As illustrated in FIG. 4). Lock it tight after being fixed. The distance of installing roller's fixed block (20) is equal to the distance of conveyor roller (30). Normally, it is 75 mm, 100 mm, 150 mm and so on. The end part of the roller's fixed block (20) is an U-shape opening (22). The roller (30) could be inlaid by it. Simultaneously, there is a little promberant edge (221) in the entrance of the U-shape opening (22). It, to prevents the roller (30) from falling off the U-shape opening when under operation. Please also refer to the FIG. 6, the roller's structure view. The roller (30) is a cylinder tube. There is a roller's shaft (31) in the suitable place of the central part. Moreover, the two ends of the roller shaft (31) stretch out of the roller (30) and are inlaid inside the U-shape opening (22) of the roller fixed black (20). Inside the two ends of the roller (30), there are bearing stands (32) of cup shape. With reference now to both FIG. 6 and FIG. 7, a bearing (321) trough for putting a bearing inside the bearing stand (32) is shown. The bottom (322) of the bearing trough (321) supports the outer ring of a bearing (35). A gap (323) in the bearing stand (32) prevents the trough bottom (322) from contacting the inner ring of the bearing (35). The slant leaning ring (324) in the bottom of the cup-shaped bearing stand (32) can help the roller's shaft (31) pierce into the central hole of the end cover (33) whose shape is like "T" (As illustrated in FIG. 8). It is prevented from falling off by pressing the protuberant part (331) of the end cover (33) into the inner hole of the bearing (35). Meanwhile, after pressing the cup-shaped bearing stand (32) into the two ends of the roller (30), it is prevented from being loosened by the contracted mouths (311) in the two ends of the roller (30) as most clearly illustrated in FIG. 6.

Figure 9:
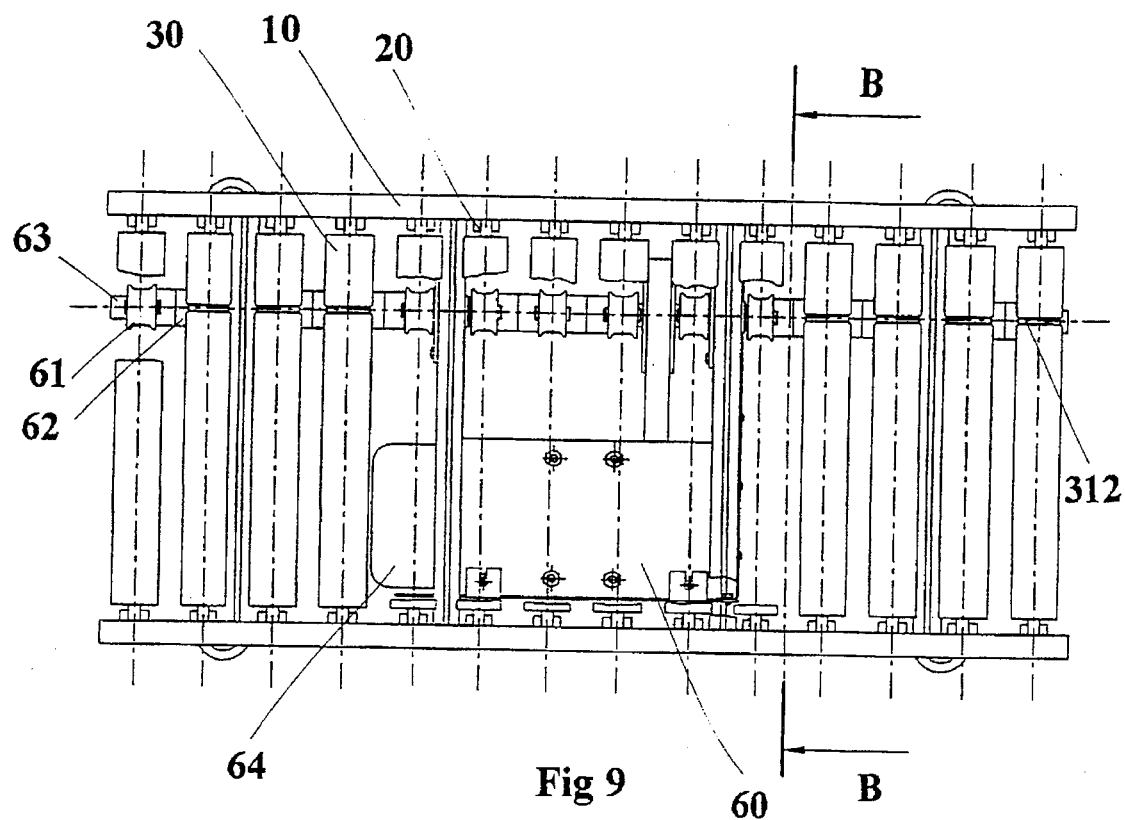
FIG. 9 is the power roller conveyor's view of this invention from above.
Figure 10:
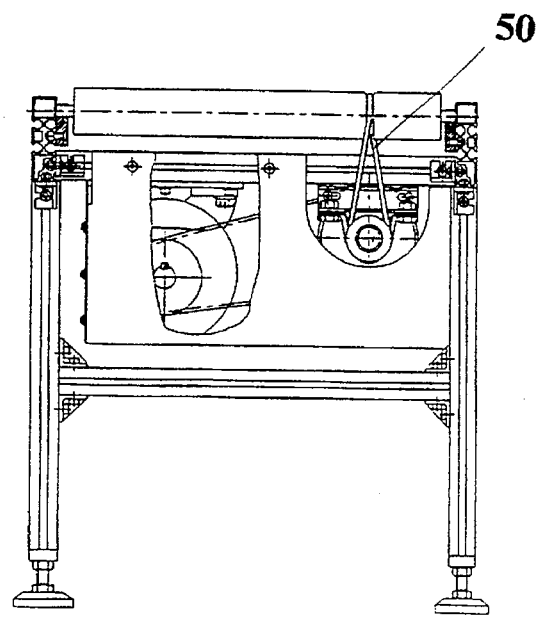
FIG. 10 is the power roller conveyor's section view of this invention.

Please refer to the FIGS. 9, 10 and 11, which are views relating to the power conveyor after being composed in accordance with this invention. These rollers (30) are installed on the roller's fixed block (20) of the main body (10). There is one or more than one concave trough (312) in a suitable place on the outer edge of the roller (30) the concave trough (312) engages the PU belt (50) and causes the roller (30) to turn. At the same time, please also refer to FIG. 12, the view of the transmission device. The PU belt (50) is engaged with the concave trough (312) on the roller (30) and the guided pulley (61) of the transmission device (60). The guided pulley (61) is connected with an incased ring (62), and there is an inlay part between the connecting point. The incased ring (62) is for the purpose of avoiding dust and keep vacancy. To incase the guided pulley (61) and incased ring (62) on the transmission shaft (63), and make the inlay part inlay with each other. It could be used for different roller distances by the different arrangements. (For instance, P=75 mm, or P=100 mm). The transmission device (60), the use of motor (64), trough belt wheel (65), time belt (66) causes the movement of the transmission shaft (63), and the turning of the guided pulley (61), moving each roller (30) by the PU belt (50) on the transmission shaft (63), making the transmission device (60) fulfill the purpose of carrying goods. Meanwhile, when carrying heavier goods, a screw hole could be added on the ring part of incased ring (62). The screw can fix the incased ring (62) onto the transmission shaft (63). (It is not illustrated in the figure.)

Figure 13:
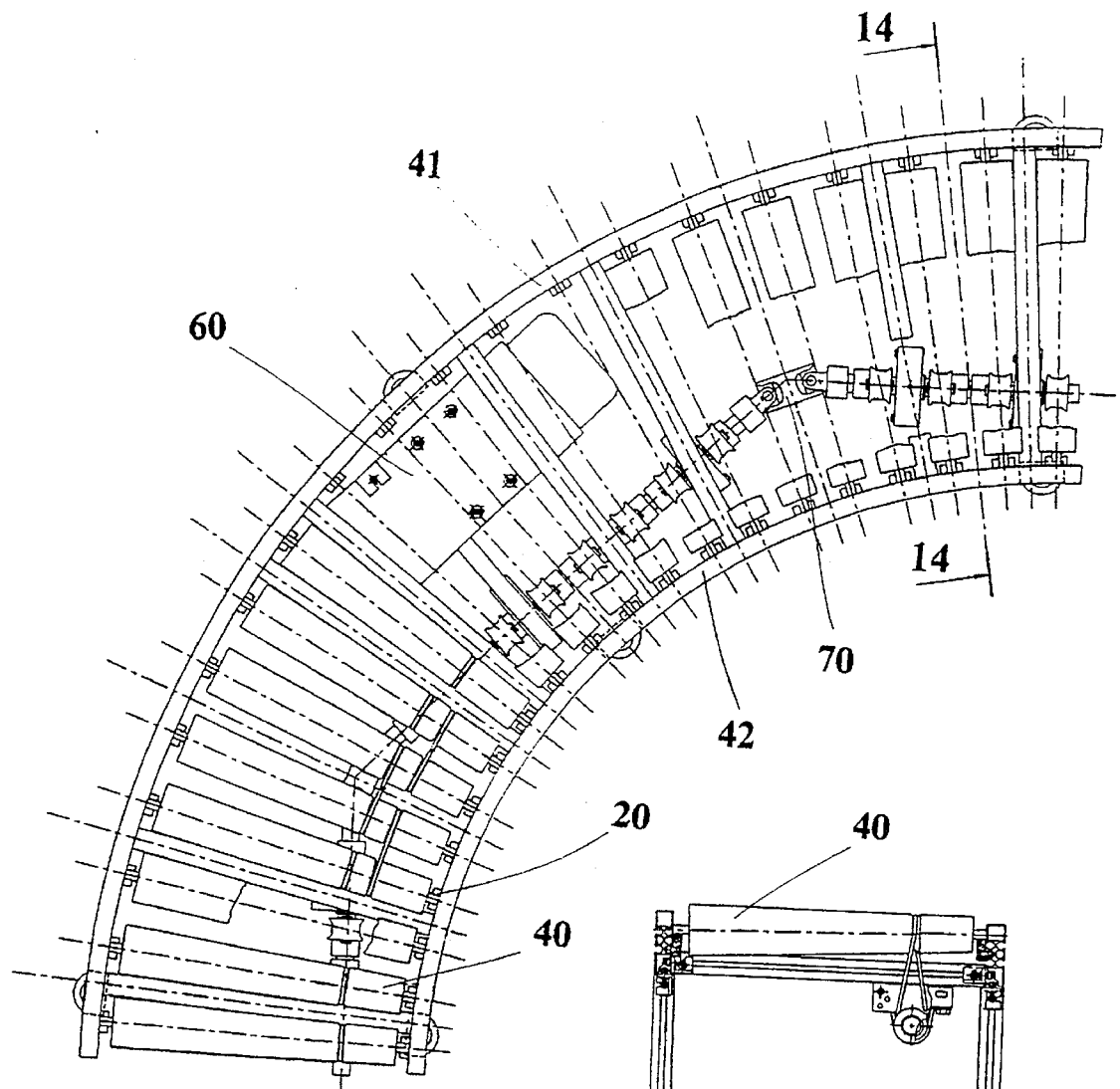
FIG. 13 is the drive turning roller conveyor view of this invention from above.
Figure 14:
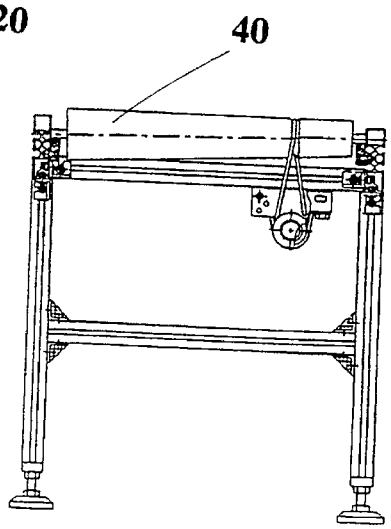
FIG. 14 is the drive turning roller conveyor section view of this invention.

FIG. 13 and 14 are the other examples of turning roller conveyor of this invention. The roller is a leaning cone roller (40). Mainly it is in use when conveyor rams. To fix the larger end of the leaning cone roller (40) on the roller fixed block (20) of the circular arc outer frame (41) and fix the smaller end on the circular arc inner frame (42). Therefore, it can keep the leaning cone roller (40) staying horizontal after being fixed. And it is convenient to work with the power roller conveyor (60). In order to comply with the angle of conveyor turning, the transmission device is formed as the shape of several blocks, and transmits the power by the universal joints (70).

Figure 15:
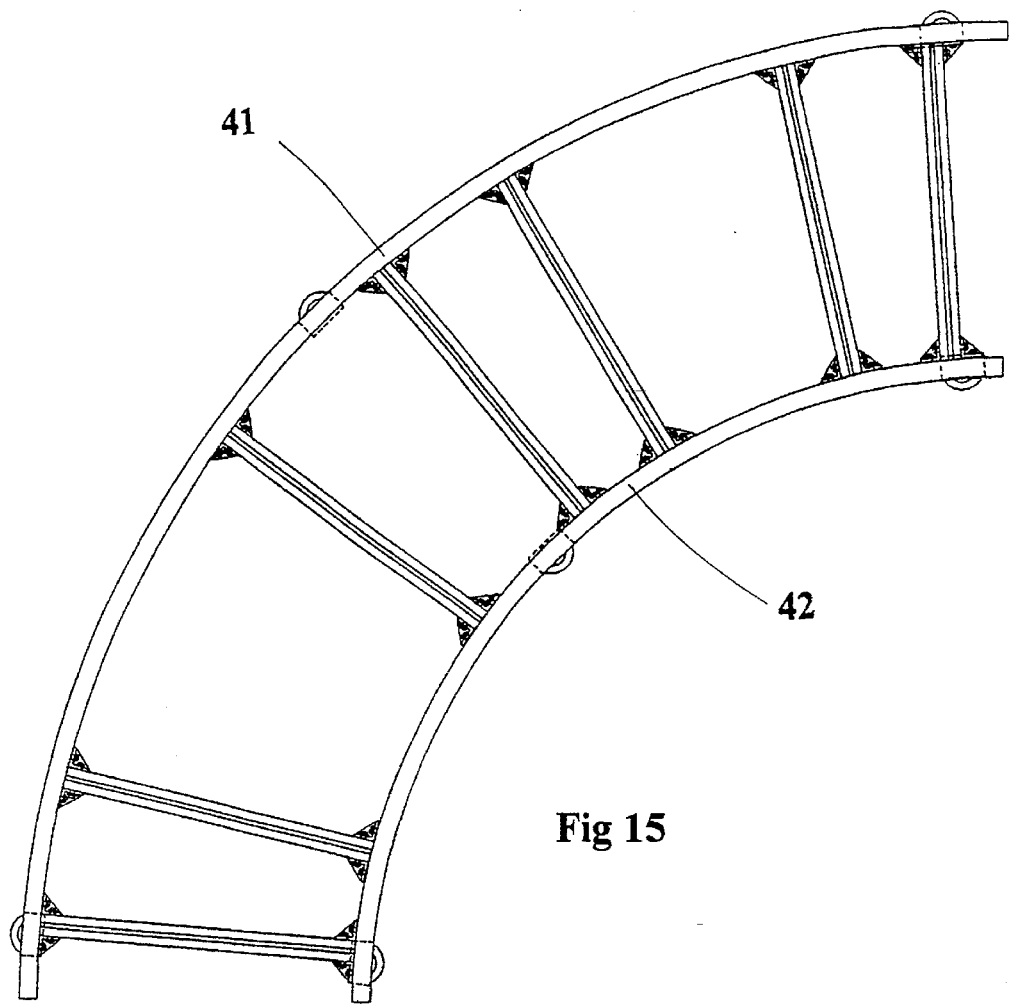
FIG. 15 is the frame of turning roller conveyor to comply with the bent level.

FIG. 15 is the frame of a turning roller conveyor to comply with the bent level. The track are all circular arc. Normally, the angles are 45°, 60° and 90°. The section view is the same as the frame (11). The other components are the same as the main body.

Figure 16:
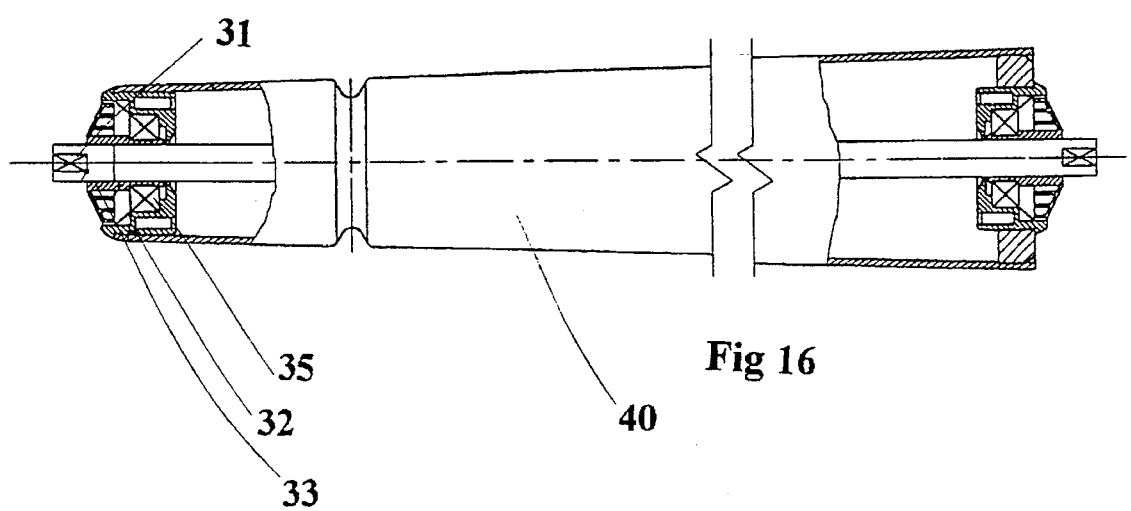
FIG. 16 is the structure view of leaning cone roller.

FIG. 16 is the structure view of leaning cone roller (40). The outer edge track of the leaning cone roller (40) forms the different numbers of concaves trough (312) and form the different styles. It meets the different transmission and makes the goods turn smoothly. The component inside is the same as roller (30). It does not need more explanation here.

To sum up, this invention is both practical and creative. In addition, this invention has not been found in any publications. It meets the requirement of new patent right application.

When, the above mentioned example is a preferred embodiment of the invention, the operation of this invention should not be limited by this example. The change and the upgrading based on the patent right of this invention should be included in the range of the patent right of this invention.

What is claim is:

1. A conveyer apparatus, comprising:
   a first frame member having a first connecting trough defined therein;
   a second frame member spacially disposed from said first frame member having a second connecting trough defined therein;
   a first roller block having a first substantially U-shaped portion, said first roller block being releasably coupled to said first connecting trough of said first frame member;
   a second roller block having a second substantially U-shaped portion, said second roller block being releasably coupled to said second connecting trough of said second frame member; and
   a roller having a first end and a second end, said first end releasably engaging said first substantially U-shaped portion of said first roller block and said second end releasably engaging said second substantially U-shaped portion of said second roller block.

2. A conveyer apparatus as defined in claim 1, further comprising:
   a motor for providing a rotational driving force; and transmission means for transmitting rotational driving forces from said motor to said roller.

3. A conveyer apparatus as defined in claim 2, wherein: said roller further includes a peripheral groove, and said transmission means engaging said peripheral groove.

4. A conveyer apparatus as defined in claim 1, wherein: said roller is substantially cylindrical and further includes a first end cap disposed on said first end and a second end cap disposed on said second end and a central shaft, said first end cap and said second end cap being in rotating engagement with said central shaft and said central shaft engaging said first roller block and said second roller block.

5. A conveyer apparatus as defined in claim 4, wherein: said roller further includes a cup-shaped roller bearing disposed on an inner periphery of said roller and being in rotational engagement with said central shaft.

6. A conveyer apparatus as defined in claim 1, wherein: said first roller block and said second roller block each further include protuberant edges on an upper surface of each substantially U-shaped portion.

7. A conveyer apparatus as defined in claim 1, wherein:

said first roller block and said second roller block each further include protuberant shoulders, said protuberant shoulder of said first roller block engaging said first connecting trough and said protuberant shoulder of said second roller block engaging said second connecting trough.

8. A conveyer apparatus as defined in claim 1, wherein:

said first frame member and said second frame member each further include seven connecting troughs, four of said connecting troughs on a first side of each frame member, two of said connecting troughs on a second side of each frame member, and one of said connecting troughs on a bottom surface of each frame member.

9. A conveyer apparatus as defined in claim 1, wherein:

said first roller block and said second roller block each further include protuberant edges on an upper surface of each substantially U-shaped portion, and said first roller block and said second roller block each further include protuberant shoulders, said protuberant shoulder of said first roller block engaging said first connecting trough and said protuberant shoulder of said second roller block engaging said second connecting trough.

10. A conveyer apparatus as defined in claim 2, wherein:

said roller is substantially cylindrical and further includes a first end cap disposed on said first end, a second end cap disposed on said second end, a central shaft, a peripheral groove and a cup shaped roller bearing, said first end cap and said second end cap being in rotating engagement with said central shaft, said central shaft engaging said first roller block and said second roller block, said transmission means engaging said peripheral groove and said cup-shaped roller bearing being disposed on an inner periphery of said roller and in rotational engagement with said central shaft.

11. A conveyer apparatus as defined in claim 10, wherein:

said first roller block and said second roller block each further include protuberant edges on an upper surface of each substantially U-shaped portion, said first roller block and said second roller block each further include protuberant shoulders, said protuberant shoulder of said first roller block engaging said first connecting trough and said protuberant shoulder of said second roller block engaging said second connecting trough, and said first frame member and said second frame member each further include seven connecting troughs, four of said connecting troughs on a first side of each frame member, two of said connecting troughs on a second side of each frame member, and one of said connecting troughs on a bottom surface of each frame member.

12. A conveyer apparatus as defined in claim 1, wherein said-first frame member comprises a first curved section, said second frame member comprises a second curved section, said roller comprises a substantially conical portion having an apex end and a base end, said apex end being associated with said first connecting trough defined in said first curved section, said base end being associated with said second connecting trough defined in said second curved section, and said first connecting trough is elevated in relation to said second connecting trough such that said substantially conical portion of said roller provides a substantially horizontal conveying surface.

13. A conveyer apparatus as defined in claim 12, wherein:

said first roller block and said second roller block each further include protuberant edges on an upper surface of each substantially U-shaped portion, said first roller block and said second roller block each further include protuberant shoulders, said protuberant shoulder of said first roller block engaging said first connecting trough and said protuberant shoulder of said second roller block engaging said second connecting trough.

14. A conveyer apparatus as defined in claim 12, further comprising:

a motor for providing a rotational force;

means for transmitting rotational forces from said motor to said substantially conical roller.

15. A conveyer apparatus as defined in claim 14, wherein:

said roller further includes a first end cap disposed on said first end, a second end cap disposed on said second end, a central shaft, a peripheral groove and a cup shaped roller bearing, said first end cap and said second end cap being in rotational engagement with said central shaft, said central shaft engaging said first roller block and said second roller block, said transmission means engaging said peripheral groove and said cup-shaped roller bearing being disposed on an inner periphery of said roller and in rotational engagement with said central shaft.

16. conveyer apparatus as defined in claim 15, wherein:

said first roller block and said second roller block each further include protuberant edges on an upper surface of each substantially U-shaped portion, said first roller block and said second roller block each further include protuberant shoulders, said protuberant shoulder of said first roller block engaging said first connecting trough and said protuberant shoulder of said second roller block engaging said second connecting trough.

* * * * *